United States Patent
Duelli et al.

(10) Patent No.: US 9,581,262 B2
(45) Date of Patent: Feb. 28, 2017

(54) VACUUM VALVE

(71) Applicant: VAT Holding AG, Haag (CH)

(72) Inventors: Bernhard Duelli, Ubersaxen (AT); Thomas Blecha, Feldkirch (AT); Anton Neumeir, Mering (DE); Christoph Angst, Eichberg (CH)

(73) Assignee: VAT Holding AG, Haag (CH)

( * ) Notice: Subject to any disclaimer, the term of this patent is extended or adjusted under 35 U.S.C. 154(b) by 86 days.

(21) Appl. No.: 14/649,033

(22) PCT Filed: Nov. 13, 2013

(86) PCT No.: PCT/EP2013/003412
§ 371 (c)(1),
(2) Date: Jun. 2, 2015

(87) PCT Pub. No.: WO2014/086458
PCT Pub. Date: Jun. 12, 2014

(65) Prior Publication Data
US 2015/0345662 A1 Dec. 3, 2015

(30) Foreign Application Priority Data

Dec. 5, 2012 (EP) .................................... 12008151

(51) Int. Cl.
*F16K 3/02* (2006.01)
*F16K 27/04* (2006.01)
*F16K 51/02* (2006.01)

(52) U.S. Cl.
CPC .......... *F16K 27/044* (2013.01); *F16K 3/0272* (2013.01); *F16K 3/0281* (2013.01); *F16K 51/02* (2013.01); *Y10T 137/6072* (2015.04)

(58) Field of Classification Search
CPC .... F16K 27/044; F16K 3/0281; F16K 3/0272; F16K 51/02; F16K 3/02; Y10T 137/6072
(Continued)

(56) References Cited

U.S. PATENT DOCUMENTS

| 3,198,384 A | 8/1965 | Martindale |
| 3,198,484 A | 8/1965 | Martindale |

(Continued)

FOREIGN PATENT DOCUMENTS

| CN | 101725721 | 6/2010 |
| CN | 101809349 | 8/2010 |

(Continued)

OTHER PUBLICATIONS

VAT Vacuum Valve Drawing, Enclosure A, distributed since Jan. 1, 1990.

(Continued)

*Primary Examiner* — John Bastianelli
(74) *Attorney, Agent, or Firm* — Volpe and Koenig, P.C.

(57) ABSTRACT

A vacuum valve including a closure element (3) and a valve housing (1) with a valve opening (4) and an interior (2) in which the closure element (3) is arranged, the closure element resting against a valve seat (6) surrounding the valve opening (4) in the closed state of the vacuum valve. The valve housing (1) has a housing wall (19) made of sheet metal, the housing wall delimiting the interior (2) and being provided with a window opening (20) in order to form the valve opening (4). The valve opening (4) is surrounded by a flange ring (21) that can be connected to a connection flange (28) of a vacuum unit (27) via screw connections, the vacuum unit having an interior and being attachable to the vacuum valve. The flange ring (21) has the valve seat (6) on which the closure element (3) is placed in the closed state of the vacuum valve.

14 Claims, 9 Drawing Sheets

(58) Field of Classification Search
USPC .................. 251/326, 328, 329; 137/315.29
See application file for complete search history.

(56) References Cited

U.S. PATENT DOCUMENTS

| | | | |
|---|---|---|---|
| 3,343,562 A | | 9/1967 | Combes |
| 3,647,178 A | * | 3/1972 | Adams .................. F16K 5/205 |
| | | | 251/148 |
| 3,844,531 A | * | 10/1974 | Grengs ................ F16K 3/0281 |
| | | | 251/327 |
| 4,052,036 A | | 10/1977 | Schertler |
| 4,238,111 A | * | 12/1980 | Norman .................. F16K 51/02 |
| | | | 251/193 |
| 4,470,576 A | | 9/1984 | Schertler |
| 4,543,981 A | * | 10/1985 | Bates .................... B22D 41/24 |
| | | | 251/302 |
| 4,747,577 A | | 5/1988 | Dimock |
| 4,809,950 A | | 3/1989 | Geiser |
| 4,921,213 A | | 5/1990 | Geiser |
| 6,431,518 B1 | | 8/2002 | Geiser |
| 6,685,163 B2 | | 2/2004 | Blecha |
| 7,011,294 B1 | | 3/2006 | Ehrne et al. |
| 8,272,825 B2 | | 9/2012 | Hofmeister et al. |
| 2010/0090145 A1 | | 4/2010 | Maerk |
| 2010/0116349 A1 | | 5/2010 | Fischer |
| 2011/0006236 A1 | | 1/2011 | Williams |
| 2011/0140019 A1 | | 6/2011 | Mahr et al. |

FOREIGN PATENT DOCUMENTS

| | | |
|---|---|---|
| CN | 102141160 | 8/2011 |
| DE | 1286360 | 1/1969 |
| DE | 2927369 | 1/1981 |
| DE | 3724465 | 1/1988 |
| DE | 3720001 | 1/1989 |
| GB | 990624 | 4/1965 |
| JP | 2012072888 | 4/2012 |
| WO | 2010034046 | 4/2010 |
| WO | 2010065976 | 6/2010 |
| WO | 2011088482 | 7/2011 |

OTHER PUBLICATIONS

VAT Vacuum Valve Drawing No. 76887, Revision B, distributed since Jan. 1, 1990.

* cited by examiner

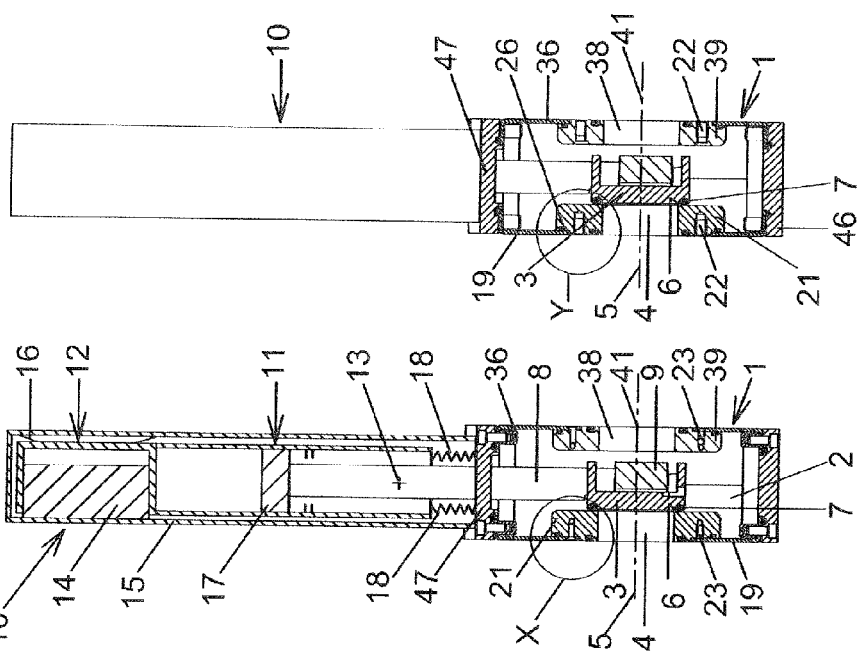
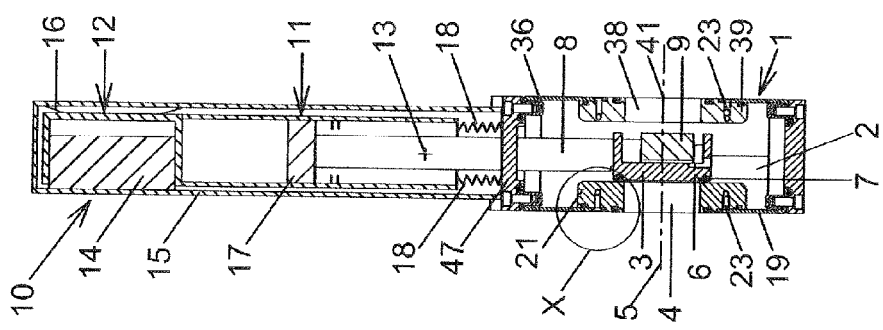
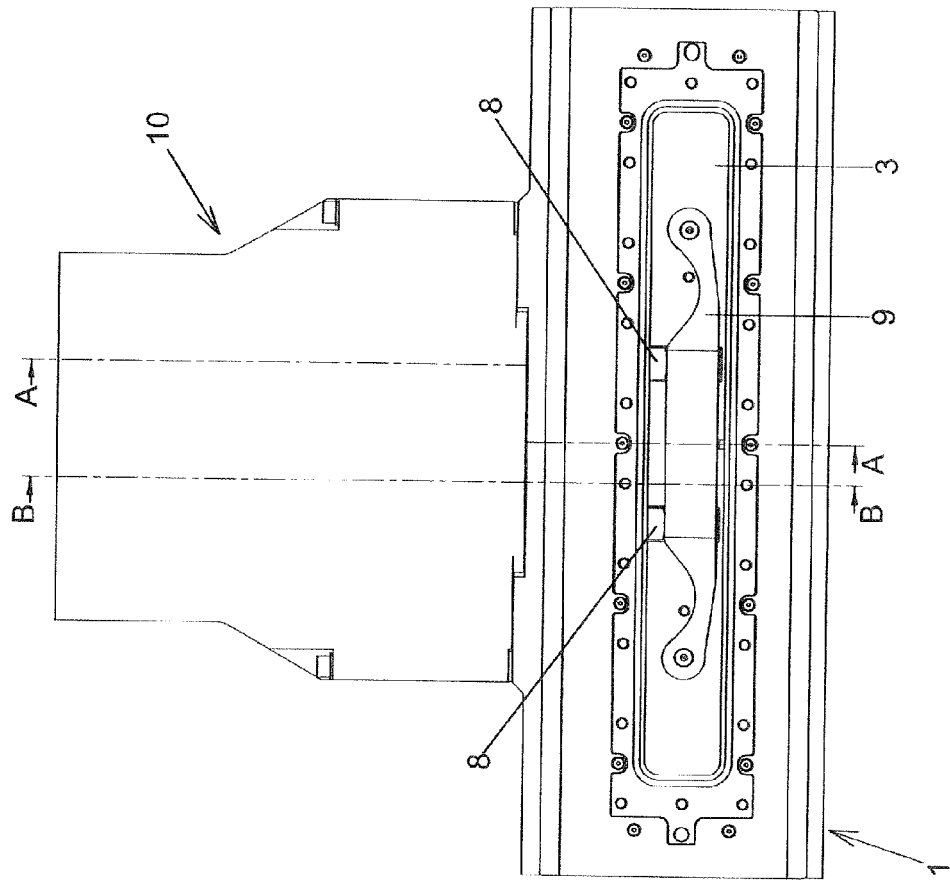

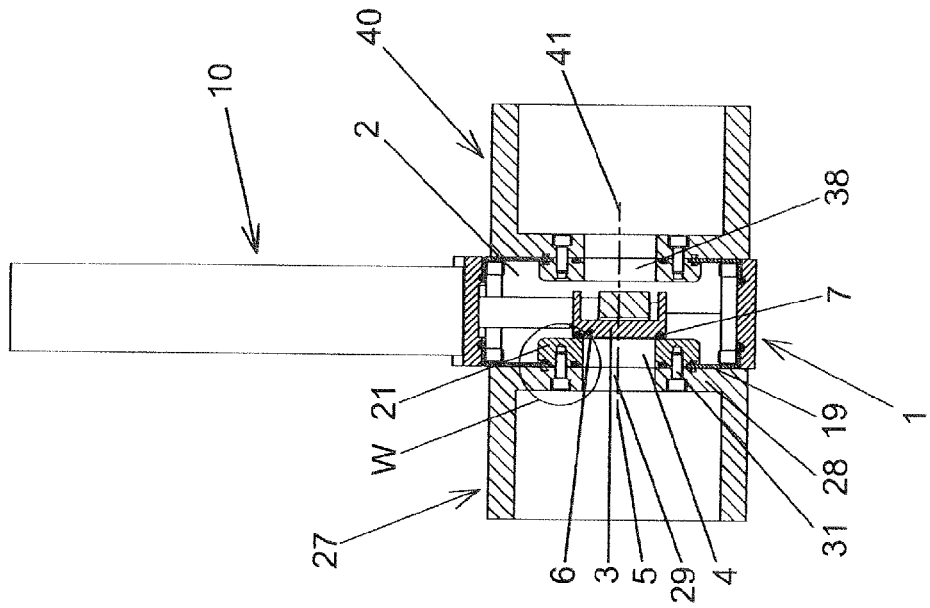
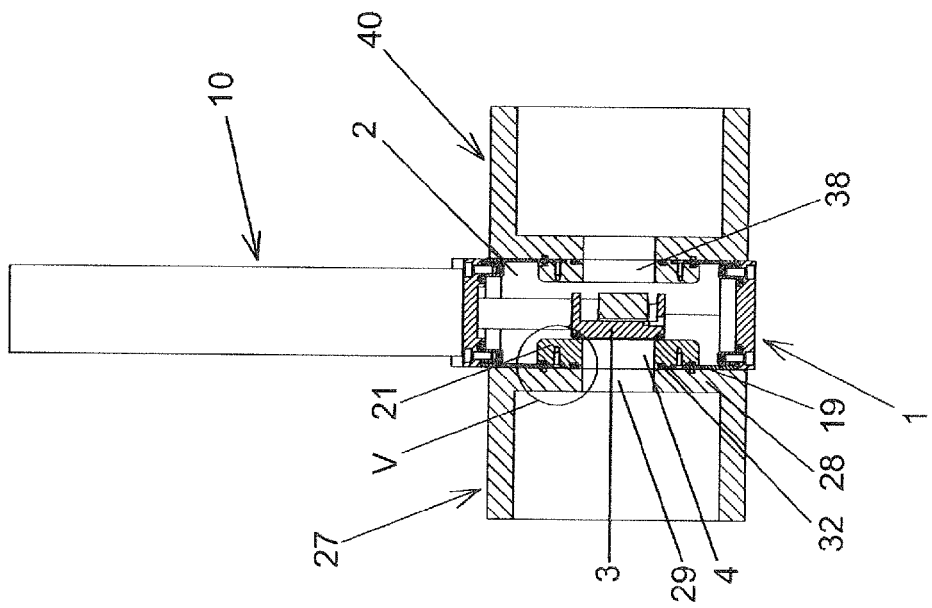

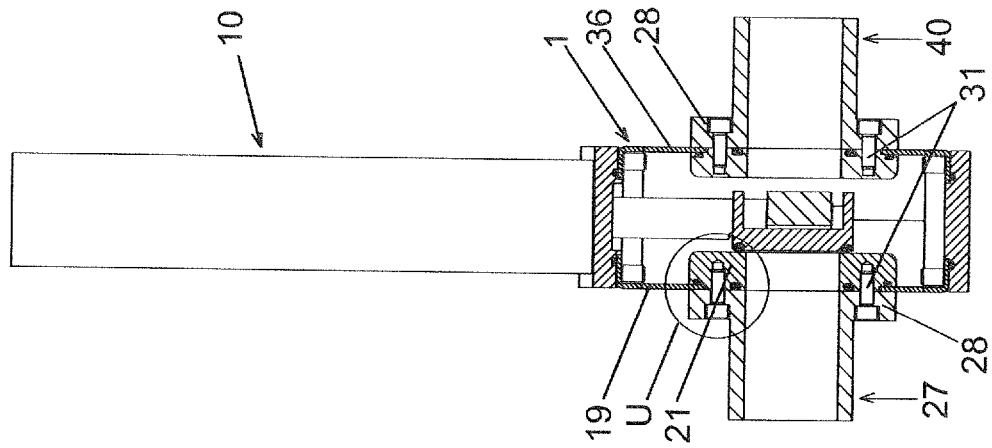
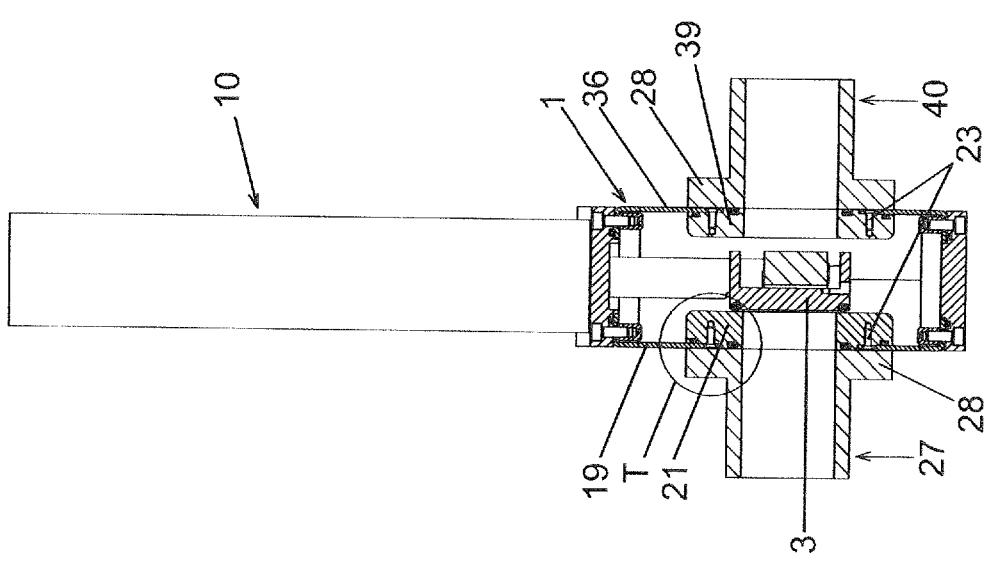

VACUUM VALVE

BACKGROUND

The invention relates to a vacuum valve comprising a closure element and a valve housing with a valve opening and with an interior space in which the closure element is arranged, which closure element, in the closed state of the vacuum valve, bears against a valve seat surrounding the valve opening, wherein the valve housing has a housing wall which delimits the interior space and which is comprised of sheet metal and which, to form the valve opening, is provided with a window recess, and wherein the valve opening is surrounded by a flange ring which is connectable by way of screw connections to an attachment flange of a vacuum unit which has an interior space, to which vacuum unit the vacuum valve can be attached.

It is known, in the case of vacuum valves, for housing walls to be formed from sheet metal in order to realize material savings. A vacuum valve of the type mentioned in the introduction emerges from WO 2011/088482 A1 and U.S. Pat. No. 7,011,294 B1. The vacuum valve has housing halves comprised of sheet metal, which form opposite first and second housing walls which are each provided with a window recess for forming a valve opening. A respective side wall of the valve housing is formed by bent sections of the two housing halves, wherein the two housing halves are welded to one another in the region of the side walls. Pipe connectors surrounding the window recesses are welded to the outer sides of the opposite housing walls, to which pipe connectors in turn there are welded solid flange rings. By way of said solid flange rings, which are equipped with passage bores, the vacuum valve can be screwed to an attachment flange of a further vacuum unit, for example of a vacuum chamber or of a pipeline. To provide the valve housing with the required stability, further measures are required; in particular, it is necessary to provide support parts which run between the two flange rings and which support said flange rings against one another, which support parts are welded to the two flange rings. The production of the vacuum valve is thus made more expensive.

Another valve comprised entirely of sheet metal emerges from DE 29 27 369 A1.

Also known are vacuum valves which have a solid valve housing, in the case of which an exchangeable annular insert part is provided within the valve housing. The insert part, which is sealed off with respect to the valve housing by way of a seal, has the valve seat, against which the closure element is caused to bear when the vacuum valve is in the closed state. A vacuum valve of said type emerges for example from JP 2012-72888 A. The closure element is in this case movable rectilinearly between its open position and its closed position, which it assumes when the vacuum valve is in the closed state, wherein the seal arranged on the closure element and the sealing surface arranged on the valve seat have a three-dimensional contour. Further vacuum valves of said type with an exchangeable valve seat are known from prior use. In this case, the valve seat can, from the direction of the interior space of the valve housing, be screwed to the housing wall which has the valve opening by virtue of connecting screws being screwed, through passage openings of the valve seat, into blind threaded bores in the housing wall. The seal between the valve seat and the housing wall is thus compressed. Owing to the removability of the valve seat, it is possible for the valve seat to be exchanged in the event of wear of the valve seat, for example due to aggressive process gases, even with the valve housing of the vacuum valve remaining connected to a further vacuum unit. It is also possible to use valve seats with different surfaces, which are for example resistant to different process gases that are used in different vacuum processes. A further vacuum valve with exchangeable valve seat emerges from U.S. Pat. No. 8,272,825 B2 (cf. FIG. 4A, right-hand side). The insert part which has the valve seat extends in this case through the window recess in the solid housing wall to the outer side of the valve housing, and there, has a seal for shielding the process gas from the flange seal of the valve housing, which flange seal is arranged in a groove of the solid housing wall.

SUMMARY

It is an object of the invention to provide an advantageous vacuum valve, which can be implemented inexpensively, of the type mentioned in the introduction. This is achieved by way of a vacuum valve having one or more features of the invention.

In the case of the vacuum valve according to the invention, the flange ring has the valve seat against which the closure element is caused to bear when the vacuum valve is in the closed state. The flange ring thus performs a dual function. Firstly, the screw connection of the vacuum valve to the attachment flange of a vacuum unit to which the vacuum valve is to be attached is performed by way of said flange ring; secondly, the flange ring also forms the valve seat of the vacuum valve. This permits an advantageous transmission of the force that is exerted on the valve seat by the closure element in the closed state, or at least of a part of said force, to the vacuum unit to which the vacuum valve is attached. The rigidity demands placed on the valve housing of the vacuum valve are thus considerably reduced, which permits a reduction in outlay in terms of construction and thus a saving of costs. Said transmission of force takes place advantageously via the housing wall, which, in an in particular annular region adjoining the window recess, is clamped between the flange ring and the attachment flange.

In one possible embodiment of the invention, to form the screw connections between the flange ring and the attachment flange of the vacuum unit, provision is made for the flange ring to be equipped with threaded bores. These threaded bores are advantageously in the form of blind bores which are formed into that surface of the flange ring which is averted from the valve seat, that is to say faces away from the inner side of the valve housing. In the case of the flange ring being formed with threaded bores, the attachment flange may expediently be formed with passage bores through which the connecting screws are passed and screwed into the threaded bores of the flange ring, wherein the heads of said connecting screws are supported on the attachment flange. In another possible embodiment, to form the screw connections between the flange ring and the attachment flange of the vacuum unit, provision is made for the flange ring to have passage bores for connecting screws to be passed through. The connecting screws are in this case expediently passed through the passage bores in the flange ring, and screwed into threaded bores in the attachment flange, from the direction of the interior space of the valve housing. Said threaded bores are for example in the form of blind bores which extend from that surface of the attachment flange which faces toward the valve housing.

It is advantageously the case that, in the assembled state, the flange ring, at its side situated opposite the valve seat, that is to say its surface averted from the valve seat, is supported on the housing wall in a support region of the housing wall, which support region adjoins the window recess of the housing wall and surrounds the window recess. When connected to the attachment flange of the vacuum unit, the housing wall is supported on the attachment flange at least over a part of the support region, preferably at least over the entire support region, possibly even over a region that extends beyond the support region. Thus, at least over a part of the support region, preferably over the entire support region, the housing wall is clamped between the flange ring and the attachment flange, possibly via a sealing ring arranged between the housing wall and the flange ring and/or via a sealing ring arranged between the housing wall and the attachment flange of the vacuum unit. This clamping also results, overall, in the valve housing being made more rigid.

In order for the flange ring to be captively held on the housing wall when the vacuum valve is not connected to a vacuum unit, the flange ring is preferably connected to the housing wall by way of retention screws. The connection to the vacuum unit by way of the connecting screws may in this case be designed such that, in the state in which the vacuum valve is attached in vacuum-tight fashion to the vacuum unit, the retention screws are without function. In this case, in the state in which the vacuum valve is attached to the vacuum unit, there may be play in the screw connection between the flange ring and the housing wall.

The screw connection between the flange ring and the housing wall by means of the retention screws is advantageously realized by virtue of the retention screws being screwed through passage openings in the housing wall into threaded bores in the flange ring. In this case, the heads of the connecting screws are situated outside the valve housing, that is to say, on that side of the housing wall which is averted from the valve seat.

In one possible embodiment of the invention, it is provided that a seal ring is arranged between the flange ring and the housing wall. Instead or in addition, a sealing ring may be arranged between the housing wall and the attachment flange.

For sealing between the flange ring of the vacuum valve and the attachment flange of the vacuum unit, an annular seal may be arranged on the flange ring, which annular seal is for example arranged in a groove of the flange ring or is vulcanized onto the flange ring. This seal is provided for interacting with an annular sealing surface provided on the attachment flange. Alternatively, it would also be possible for the flange ring to have an annular sealing surface which is provided for interacting with an annular seal arranged on the attachment flange. The measures mentioned above could also be combined.

In one advantageous embodiment of the invention, the valve housing, in addition to the first housing wall comprised of sheet metal described above, comprises a second housing wall which is comprised of sheet metal and which, to form a second valve opening of the valve housing, is provided with a window recess. In addition to the first flange ring described above, in this case a second flange ring is provided which surrounds the second valve opening and which is connectable by means of screw connections to an attachment flange of a further vacuum unit, to which the vacuum valve can be attached. In a possible first variant of this embodiment, the second flange ring is in this case designed entirely analogously to the first flange ring and is connected or connectable in the same way to the further parts (housing wall, vacuum unit), with the exception of the fact that the second flange ring does not form a valve seat for a closure element. In a second possible variant, the second flange ring also forms a second valve seat, against which the closure element or a further closure element can be caused to bear.

In the case of a vacuum valve according to the invention, the closure element and correspondingly the geometrical form of the valve seat may be designed very differently. The same applies to the valve drive.

For example, in the case of a vacuum valve according to the invention, the movement of the closure element between its open position when the vacuum valve is in the open state and its closed position when the vacuum valve is in the closed state may be substantially L-shaped. Such valves with L-shaped movement are known for example from U.S. Pat. No. 6,431,518 B1, WO 2010/065976 A1 or WO 2010/034046 A1, and the valve drive and the form of the closure element of a vacuum valve according to the invention may for example be designed as described in said documents. The individual movement components of the L-shaped movement may in this case be effected by the same or different actuators.

A vacuum valve according to the invention may for example also be designed such that the entire closing movement between the open position and the closed position of the closure element is entirely rectilinear. Such vacuum valves, in which furthermore no spreading of the closure element occurs, are known for example from U.S. Pat. No. 4,809,950 A, U.S. Pat. No. 6,685,163 B2, U.S. Pat. No. 4,921,213 A or from U.S. Pat. No. 7,011,294 B1 as cited in the introduction. The valve drive, the form of the closure element and the valve seat of a vacuum valve according to the invention may for example be designed as described in said documents. For example, U.S. Pat. No. 4,052,036 A or U.S. Pat. No. 4,470,576 A disclose vacuum valves in the form of a slide valve. The valve drive and the form of the closure element of a vacuum valve according to the invention may for example be designed as described in said documents. For example, U.S. Pat. No. 7,011,294 B1 and WO 2011/088482 A1 disclose vacuum valves with wedge-shaped, spreadable closure elements. The form of the closure element, of the valve seat and the valve drive of a vacuum valve according to the invention may for example be designed as described in said documents.

Also conceivable and possible is a design of a vacuum valve according to the invention with a closure element which is pivotable between its open position and its closed position about an axis. Vacuum valves with closure elements which are pivotable about an axis between the open position and a position situated opposite the valve seat but raised from the valve seat, which axis is at right angles to the plane in which the valve seat lies, are also referred to as pendulum valves. The valve drive and the form of the closure element and of the valve seat of a vacuum valve according to the invention may also be designed in the manner of a pendulum valve.

The invention advantageously makes it possible for different flange rings to be inserted into a valve housing of otherwise identical design. It is thus possible to provide a modular system in which the valve housing can be easily adapted to different closure elements and/or valve drives through the use of a corresponding flange ring, even in accordance with different sealing principles, for example in the form of L-valves or valve slides.

BRIEF DESCRIPTION OF THE DRAWINGS

Further advantages and details of the invention will be discussed below on the basis of the appended drawing, in which:

FIG. 1 shows a view of an exemplary embodiment of a vacuum valve according to the invention;

FIG. 2 shows a section along the line AA from FIG. 1;

FIG. 3 shows a section along the line BB from FIG. 1 (without the valve drive being illustrated);

FIGS. 6 and 7 show sections analogous to FIG. 2 and FIG. 3 (without the valve drive being illustrated), with the vacuum valve attached to vacuum units in the form of vacuum chambers;

FIG. 11 and FIG. 12 show sections analogous to FIG. 6 and FIG. 7, with the vacuum valve attached to modified vacuum units in the form of vacuum chambers;

DETAILED DESCRIPTION OF THE PREFERRED EMBODIMENTS

Figure 4:
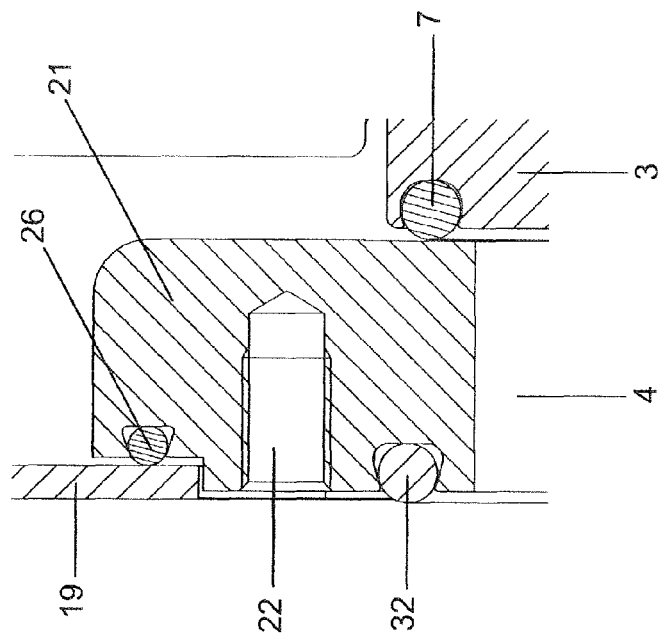
FIG. 4 shows an enlarged detail X from FIG. 2.
Figure 5:
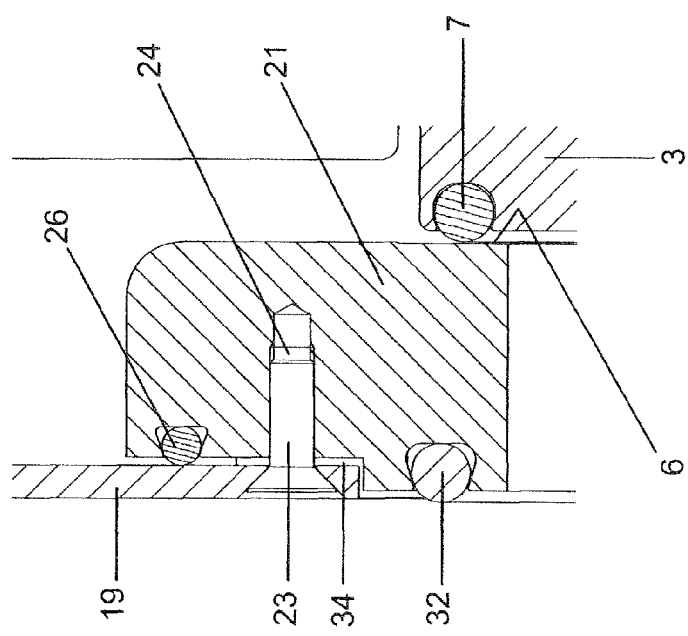
FIG. 5 shows an enlarged detail Y from FIG. 3.
Figure 9:
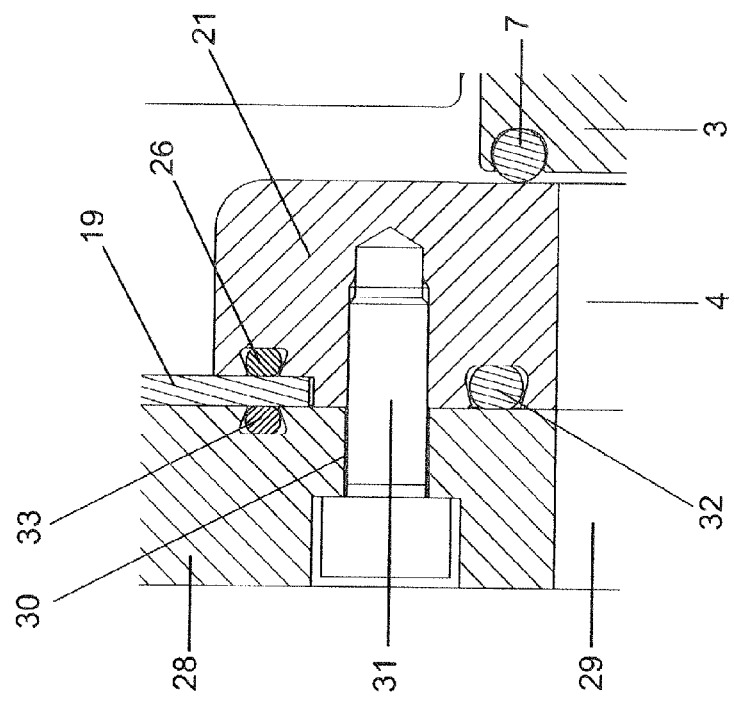
FIGS. 8 and 9 show enlarged details V and W from FIG. 6 and FIG. 7.
Figure 8:
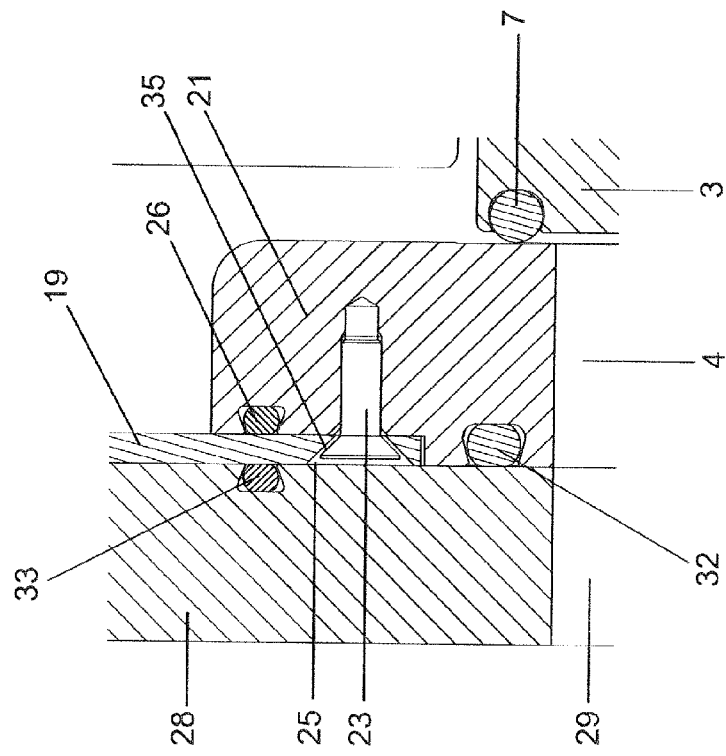

A first embodiment of a vacuum valve according to the invention is illustrated in FIGS. 1 to 14.

The vacuum valve has a valve housing 1 which has an interior space 2 in which there is arranged a closure element 3, which is of plate-shaped form in the exemplary embodiment.

In the closed state of the vacuum valve illustrated in the Figures, a valve opening 4 of the valve housing, which valve opening has an axis 5, is closed by the closure element 3. For this purpose, the closure element 3 is pressed against a valve seat 6 which surrounds the valve opening 4. In the exemplary embodiment shown, an elastomer seal 7 is arranged on the closure element 6, which seal bears against a sealing surface of the valve seat 6. In a modified embodiment, it would also be possible for the seal to be arranged on the valve seat 6 and for the sealing surface to be arranged on the closure element 3.

When the vacuum valve is in the closed state, the closure element 3 assumes the closed position illustrated in the Figures.

When the vacuum valve is in the open state, the valve opening 4 is opened up by the closure element, wherein the closure element assumes its open position. It is preferably the case that, when the vacuum valve is in the open state, the closure element 3 does not overlap the valve opening 4 as viewed in the direction of the axis 5 of the valve opening 4.

The closure element 3 is attached to valve rods 8. In the exemplary embodiment shown, a cross member 9 is fastened to the valve rods 8, which cross member in turn is fastened to the closure element 3. Under torsion of the cross member, a certain degree of tilting of the closure element 3 about an axis perpendicular to the valve rods 8 is possible in order, in a simple manner, to attain at least substantially uniform contact pressure of the seal 7 when the vacuum valve is in the closed state.

The opening and closing of the vacuum valve is performed by way of an adjustment of the valve rods 8 by means of a valve drive 10. The valve drive 10 may be designed in different ways, and may have one or more actuators which are operated for example pneumatically or electrically.

Only FIG. 2 schematically illustrates, as an example, a possible embodiment of a valve drive 10. The valve drive comprises a first actuator 11 in the form of a piston-cylinder unit and a second actuator 12 in the form of a piston-cylinder unit. The cylinders of said actuators 11, 12 are rigidly connected to one another and are pivotable about a pivot axis 13 which is perpendicular to the valve rods 8 and to the axis 5 of the valve opening 4, said pivot axis being merely schematically indicated. By means of the piston 14 of the second actuator 12, which is supported on a drive housing 15, the interconnected cylinders of the actuators 11, 12 can be pivoted about the pivot axis 13 counter to the force of a restoring spring 16. The piston rod that is attached to the piston 17 of the first actuator 11 is connected to the valve rods or forms one of the valve rods 8. For example, actuators 11, 12 designed in the illustrated manner may be provided for both valve rods 8, which actuators are operated synchronously. It would for example also be possible for the valve rods to be connected to the piston rod of a common actuator 11 by way of a yoke running in the direction of the pivot axis 13.

The valve rods 8 are each connected in vacuum-tight fashion to the valve housing 1 by way of a corrugated bellows 18.

If the vacuum valve is to be opened proceeding from the closed state illustrated, the cylinder of the second actuator 12 is firstly aerated, such that the valve rods 8 are pivoted about the pivot axis 13 by the restoring spring 16, whereby the valve closure element 3 lifts from the valve seat 6 but, in this case, continues to overlap the valve opening 4 as viewed in the direction of the axis 5. Subsequently, the valve rods 8 are adjusted axially by means of the first actuator 11, such that the valve opening 4 is opened up.

For closing, the closure element 3 is firstly adjusted by means of the actuator 11 into the position in which it overlaps the valve opening 4 as viewed in the direction of the axis 5 but is lifted from the valve seat 6. Subsequently, the valve rods 8 are adjusted by means of the second actuator 12 about the pivot axis 13, such that the closure element 3 is pressed against the valve seat 6.

A valve which is closed and opened in such a manner may also be referred to as an L-valve. Instead of a rectilinear displacement in conjunction with a pivoting movement about the pivot axis 13, an L-shaped movement may also be performed in the form of two rectilinear movements running perpendicular to one another, as is known. A valve according to the invention may also be operated with some other opening and closing movement.

Figure 10:
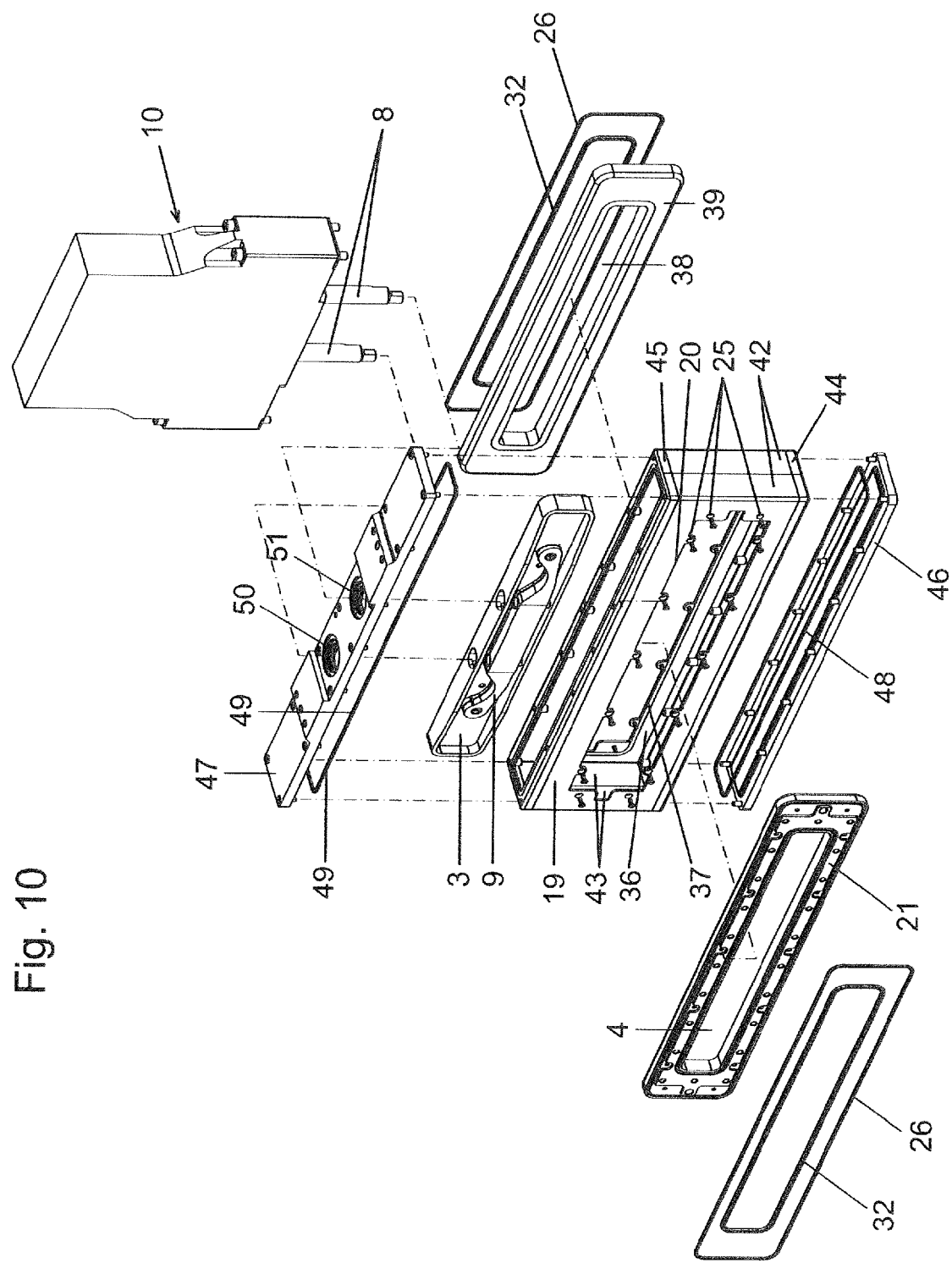
FIG. 10 shows a perspective view of the vacuum valve, with parts of the vacuum valve illustrated separate from one another in the manner of an exploded diagram.
Figure 13:
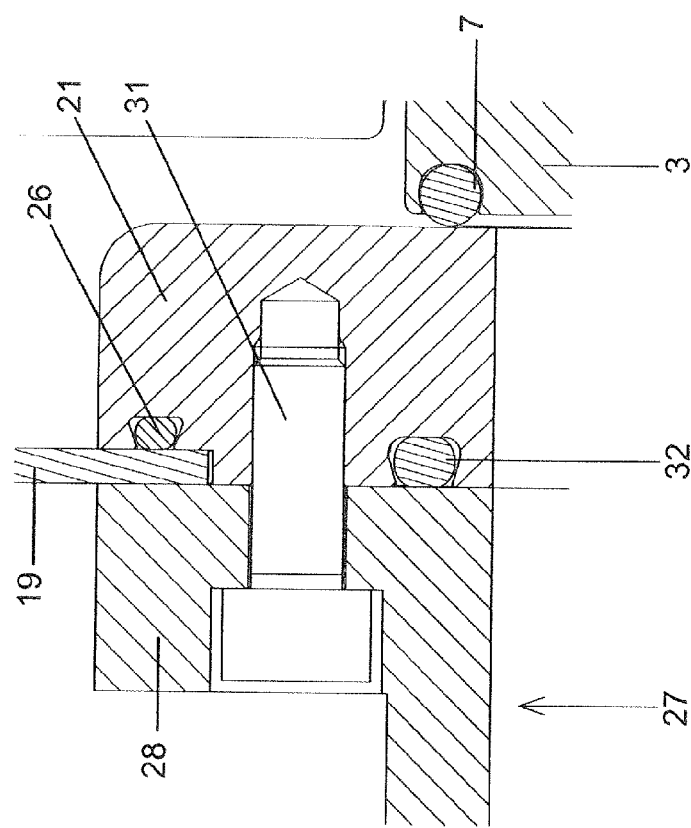
FIGS. 13 and 14 show enlarged details T and U from FIG. 11 and FIG. 12.
Figure 14:
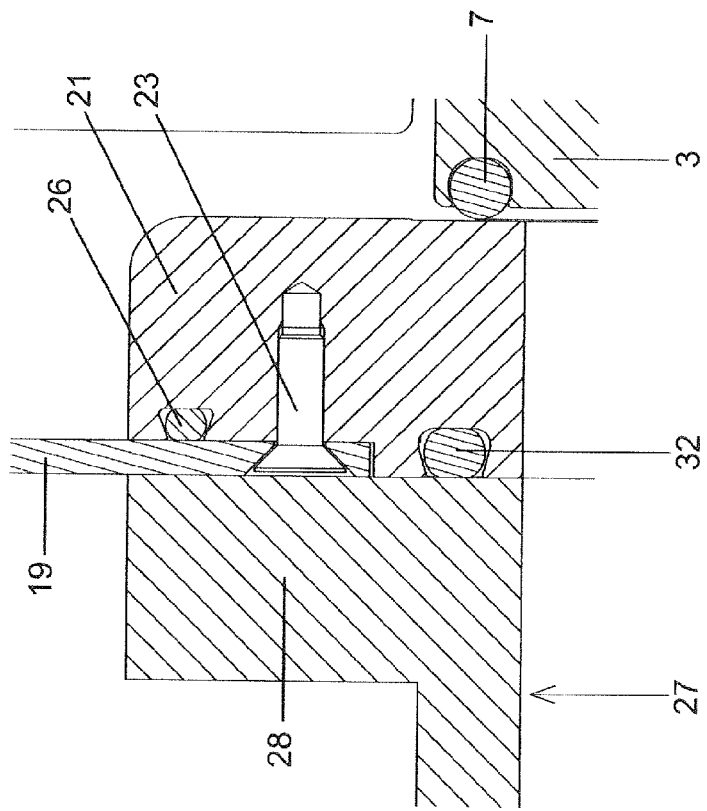

The valve housing 1 has a first housing wall 19, which in the exemplary embodiment is planar, with a window recess 20 (cf. FIG. 10). The valve opening 4 is situated in the region of the window recess 20 but is smaller than the latter. The first housing wall is comprised of sheet metal. The thickness of the sheet metal is less than 5 mm, preferably less than 4 mm, wherein a value of less than 3 mm is particularly preferred. The thickness of the sheet metal is advantageously greater than 1 mm. The sheet metal is in particular sheet steel.

The valve opening 4 is formed by the ring opening of a first flange ring 21, that is to say the flange ring delimits the valve opening 4 over its entire circumference.

As viewed in the direction of the axis 5 of the valve housing 1, the flange ring protrudes into the region of the window recess 20 of the housing wall 19, specifically over the entire circumference of the flange ring 21.

In a view toward the outer side of the housing wall 19 in the direction of the axis 5 of the valve opening 4, the flange ring 21 is, by way of a section adjoining its outer circumference and over its entire circumference, situated behind the housing wall 19. The radial extent, in relation to the axis 5, of the flange ring 21 toward the outside is thus greater, over the entire circumference of the flange ring 21, than the corresponding extent of the window recess 20.

In other words, at its side averted from the closure element 3, that is to say situated opposite the valve seat 6, the flange ring is supported on the housing wall 19, specifically by way of a support region of the housing wall 19, which support region completely surrounds the window recess 20 of the housing wall 19. An annular support region of the flange ring 21 interacts with said annular support region of the housing wall 19. In relation to the radial direction with respect to the axis 5 of the valve opening 4, the housing wall 19 and the flange ring 21 overlap over their support regions.

On its side facing toward the housing wall 19, the flange ring 21 has a depression in which the support region of the housing wall 19 lies. The depression adjoins the outer circumference of the flange ring 21. In the exemplary embodiment, the depth, measured in the direction of the axis 5, of the depression at least substantially corresponds to the thickness of the sheet metal of the housing wall 19. The deviation between the depth of the depression and the thickness of the sheet metal of the housing wall 19 is expediently less than 30% of the thickness of the sheet metal of the housing wall 19.

The flange ring 21 is of solid form. Its thickness in relation to the direction of the axis 5 of the valve opening 4 (the extent between its axial surfaces) amounts, over its entire extent, to more than 5 mm, preferably more than 1 cm, wherein a value of more than 1.5 cm is particularly preferred.

In relation to the direction of the axis 5 of the valve opening 4, the thickness of the flange ring 21 amounts to more than three times, preferably more than five times, the thickness of the housing wall 19.

The material thickness of the flange ring 21 in relation to the radial direction with respect to the axis 5 of the valve opening 4 (the extent between the radial surfaces of said flange ring) amounts to more than 1 cm, preferably more than 2 cm, over the entire circumference of said flange ring.

The flange ring 21 has threaded bores 22 in the form of blind bores. The threaded bores extend from that surface of the flange ring 21 which is directed toward the outer side of the valve housing 1 (that is to say said threaded bores are situated on that side of the flange ring 21 which is situated opposite the valve seat 6). In this case, the threaded bores 22 are situated in a region of the flange ring 21 which, as viewed in the direction of the axis 5 of the valve opening 4, is situated in the region of the window recess 20. It would however also be possible for the threaded bores 22 to be situated radially outside the window recess 20, wherein the housing wall 19 would then have corresponding bores through which the threaded bores 22 would be accessible.

On its axial surface directed toward the interior space 2 of the valve housing 1, the flange ring 21 forms the valve seat 6. In the exemplary embodiment, the flange ring has, for this purpose, a sealing surface against which the seal 7 bears when the vacuum valve is in the closed state. It would however also be possible for the seal to be arranged on the flange ring, for example in a groove or vulcanized on, and it would be possible for the closure element 3 to have a sealing surface that interacts with the seal.

The flange ring 21 is connected to the housing wall 19 by way of retention screws 23. For this purpose, the flange ring 21 has, on its side situated opposite the valve seat 6, threaded bores 24 which are in the form of blind bores which are aligned with holes 25 in the housing wall 19. The retention screws 23 are screwed into the threaded bores 24 through the holes 25, wherein the heads of said retention screws bear in each case against a region, which surrounds the respective hole 25, on the outer side of the housing wall 19.

The longitudinal extents of the retention screws 23 lie parallel to the axis 5 of the valve opening 4.

In the exemplary embodiment, an elastomer sealing ring 26 is arranged between the housing wall 19 and the flange ring 21, which sealing ring is situated radially to the outside of the retention screws 23 in relation to the axis 5. Here, the sealing ring 26 may, as illustrated, be arranged in a groove of the flange ring. It would for example also be possible for a sealing ring to be provided which is vulcanized onto the flange ring 21 or onto the housing wall 19.

In modified embodiments, the sealing ring 26 may also be omitted (see further below).

The vacuum-tight attachment of the vacuum valve to a vacuum unit 27, wherein the interior space 2 of the valve housing 1 communicates with an interior space of the vacuum unit 27 via the valve opening 4, is realized by way of the flange ring 21. The vacuum unit 27 is for example a vacuum chamber. It would for example also be possible for the vacuum unit to be a pipeline. The vacuum unit 27 has an attachment flange 28 for connection to the flange ring 21. In the exemplary embodiment illustrated in FIGS. 6 to 9, the attachment flange 28 is formed by that side wall of the vacuum unit 27 which has the opening 29. For this purpose, said side wall has passage bores 30 for connecting screws 31 to be passed through, which connecting screws are screwed into the threaded bores 22 of the flange ring 21. The head of a respective connecting screw 31 is supported on an interior space-side surface of the attachment flange 28.

The longitudinal extents of the connecting screws 31 lie parallel to the axis 5 of the valve opening 4.

An annular seal 32 comprised of an elastomer material is arranged between the attachment flange 28 and the flange ring 21. In relation to the axis 5, the seal 32 is situated radially to the inside of the connecting screws 31 and seals off the flange ring 21 with respect to the attachment flange 28. For example, the seal 32 is arranged in a groove of the flange ring 21 and bears against a sealing surface of the attachment flange 28. It would also be possible for the seal 32 to be arranged in a groove of the attachment flange 28 or to be vulcanized onto the flange ring 21 or onto the attachment flange 28. It would also be possible for seals to be arranged on both parts 21, 28, which seals bear in each case against a sealing surface of the other part.

Furthermore, between the housing wall 19 and the attachment flange 28, there is arranged an elastomer sealing ring 33 which, in the state in which the vacuum valve is attached to the vacuum unit 27, seals off the housing wall 19 with respect to the attachment flange 28. In relation to the axis 5, the sealing ring 33 is situated radially to the outside of the connecting screws 31 and radially to the outside of the retention screws 23. For example, the sealing ring 33 is arranged in a groove of the attachment flange 28. It would also be possible for said sealing ring to be vulcanized onto the attachment flange or onto the housing wall 19.

When the vacuum valve is connected to the vacuum unit 27, the housing wall 19 is sealed off with respect to the flange ring 21 by the sealing ring 26. The required contact pressure of the flange ring 21 against the housing wall 19 may in this case be imparted by the connecting screws 31. The retention screws 23 alone would in this case not effect adequate compression of the sealing ring 26. It can be seen from FIGS. 4 and 5 that there is a gap 34 between the flange ring 21 and the housing wall 19 in the region around the sealing ring 26 when the vacuum valve is not connected to the vacuum unit 27 by way of the flange ring 21. It can be seen from FIGS. 8 and 9 that said gap 34 is closed by the connecting screws 31 in the state in which the vacuum valve is attached to the vacuum unit 27. There is then a corresponding gap 35 between the head of the respective retention screw 23 and the housing wall 19. That is to say, the retention screws 23 are without function in the state in which the vacuum valve is attached to the vacuum unit 27 by way of the flange ring 21 and the connecting screws 31.

On the other hand, it is also basically conceivable and possible for the retention screws 23 alone to compress the sealing ring 26 to an adequate extent and close the gap 34. The retention screws 23 must be designed to be strong enough for this purpose, and an adequate number of retention screws 23 must be provided for this purpose.

In the state in which the vacuum valve is attached to the vacuum unit 27, the housing wall 19 is clamped between the flange ring 21 and the attachment flange 28 by the screw connections between said two parts. In this case, the clamping is realized in the region of the radial overlap of said parts in relation to the axis 5. If the attachment flange 28, in relation to the radial direction, extends at least over the support region of the housing wall 19, which support region adjoins the window recess 20 of the housing wall 19 and over which support region the flange ring 21 is supported on the housing wall 19, the clamping is realized over said support region of the housing wall 19.

In the attachment example shown in FIGS. 11 and 12, the vacuum valve is connected by way of the flange ring 21 to a vacuum unit 27 which has an attachment flange 28 projecting radially outward in the manner of an annular collar. The connecting screws 31, which in turn extend through passage bores 30 through the attachment flange 28 and are screwed into the threaded bores 22 of the flange ring 21, are in this case situated outside the vacuum region (whereas, in the attachment example illustrated in FIGS. 6 to 9, said connecting screws are situated within the vacuum region). Correspondingly, no sealing is required between the attachment flange 28 and the housing wall 19, and the sealing ring 33 shown in FIGS. 6 to 9 can be omitted. The connection between the vacuum valve and the vacuum unit 27 is otherwise the same as that described above.

In addition to the first housing wall 19, the valve housing 1 has a second housing wall 36 comprised of sheet metal, which second housing wall is situated opposite the first housing wall 19 and, in the exemplary embodiment, is of planar form. The housing wall 36 has a window recess 37, in the region of which a second valve opening 38 of the valve housing 1 is situated. The second valve opening 38 is delimited over its entire circumference by a solid second flange ring 39. The second flange ring 39 serves for the vacuum-tight attachment of the vacuum valve to a further vacuum unit 40, wherein the interior space 2 of the valve housing 1 communicates with the interior space of the vacuum unit 40 via the second valve opening 38.

In the exemplary embodiment shown, the axis 41 of the second valve opening 38 coincides with the axis 5 of the first valve opening 4. In other exemplary embodiments, it would also be possible for said axes to be oriented parallel to one another but situated offset with respect to one another, or else to be oriented at an angle with respect to one another.

In the exemplary embodiment shown, the shape and size of the second valve opening 38 correspond to the shape and size of the first valve opening 4. Different configurations in terms of shape and/or size are also conceivable and possible.

In this exemplary embodiment, said second flange ring 39 does not form a valve seat for the closure element 3. Aside from this difference, the second flange ring 39, the second housing wall 36, the connection thereof to one another by way of retention screws 23, and the connection to the further vacuum unit 40 by way of connecting screws 31 are of identical design to those in the above description in conjunction with the first housing wall 19, the first flange ring 21 and the connection thereof to one another and to the vacuum unit 27. There will therefore be no repetition at this juncture.

Running between the first and second housing walls 19, 36, which could also be referred to as front and rear housing walls of the valve housing 1, there are side walls 42, 43 of the valve housing 1, which side walls delimit the interior space 2 on opposite sides. In the exemplary embodiment, said side walls 42, 43 are likewise formed from sheet metal. For example, metal sheets which form the housing walls 19, 36 may have bent ends which form in each case a part of the respective side wall 42, 43. Those edges of the bent sections which abut against one another are welded to one another.

Upper and lower flange parts 44, 45 comprised of sheet metal are welded to the interconnected housing walls 19, 36 and side walls 42, 43, to which flange parts a solid base part 46 and a solid cover part 47 of the valve housing 1 are screwed. For example, the flange parts 44, 45 have screw sleeves for this purpose. To seal off the interior space 2 of the valve housing 1, in each case one elastomer sealing ring 48, 49 is arranged between the flange part 44 and the base part 46 and between the flange part 45 and the cover part 47.

The valve rods 8 are led out through openings 50, 51 of the cover part 47 in sealed fashion, for example by way of elastomer sealing rings or by way of corrugated bellows.

Where it is stated above that a connection between the vacuum valve and a vacuum unit is vacuum-tight, this is to be understood to mean that, in the interior space 2 of the valve housing, at least a pressure of below $10^{-3}$ mBar can be maintained at least for more than one hour. Here, it is assumed that the interior space of the vacuum unit that communicates with the interior space 2 of the valve housing 1 has the same volume as the interior space 2 of the valve housing 1, and the other valve opening should be closed in leakage-free fashion by a blind flange.

Figure 15:
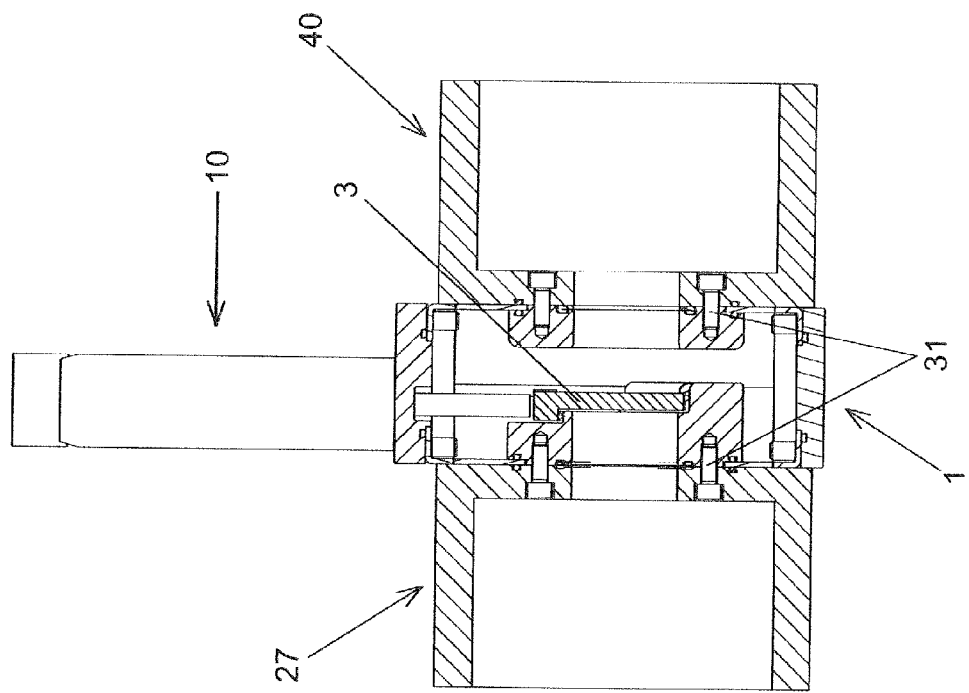
FIGS. 15 and 16 show sections, analogous to FIG. 6 and FIG. 7, of a second embodiment of a vacuum valve according to the invention.
Figure 16:
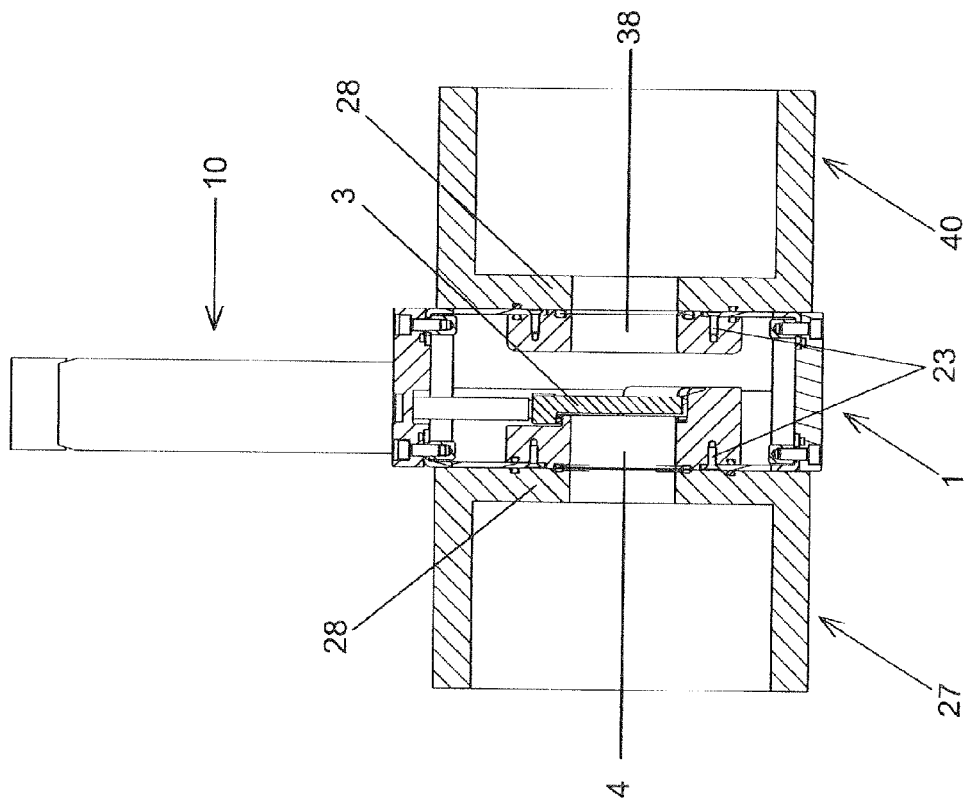

FIGS. 15 and 16 show a second embodiment of a vacuum valve according to the invention. The vacuum valve corresponds to the vacuum valve illustrated in FIGS. 1 to 14, aside from the following differences:

In this case, the closure element 3 is moved rectilinearly from its open position in the open state of the vacuum valve into its closed position in the closed state of the vacuum valve. For this purpose, the at least one valve rod 8, to which the closure element 3 is attached, is displaced rectilinearly in the direction of its longitudinal axis by the valve drive 10. The valve drive 10 may for example be formed by a single piston-cylinder unit, the piston rod of which is connected to the at least one valve rod 8 or forms the valve rod 8. The seal arranged on the closure element 3 and the sealing surface arranged on the valve seat 6 have, in this case, a three-dimensional form. It would also be possible for the seal to be arranged on the valve seat 6 and the sealing surface to be arranged on the closure element 3. Vacuum valves with closure elements and valve seats designed in this form are known, for example from the prior art cited in the introduction.

The connections to the vacuum units 27, 40 are realized in the same way as described on the basis of the first embodiment of the vacuum valve according to the invention.

Figure 18:
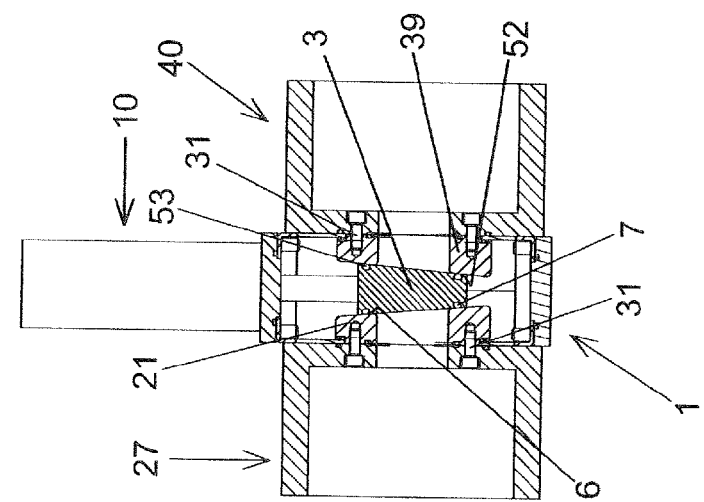
FIGS. 17 and 18 are illustrations, analogous to FIG. 6 and FIG. 7, of a third embodiment of a vacuum valve according to the invention.
Figure 17:
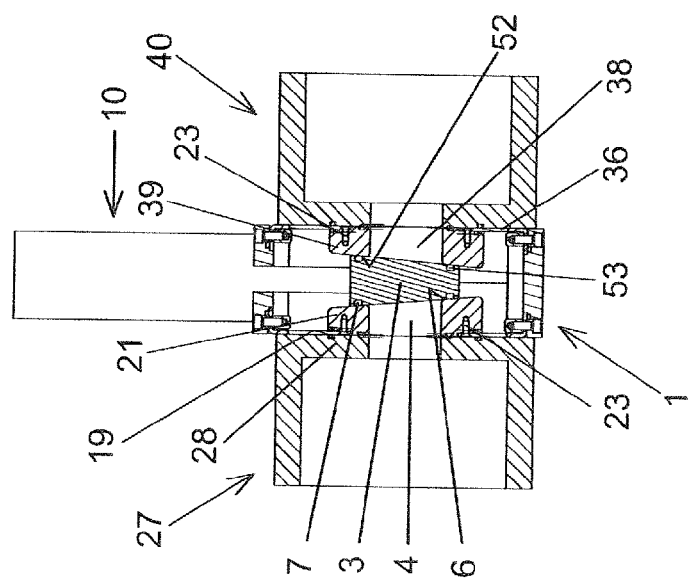

FIGS. 17 and 18 show a third embodiment of a vacuum valve according to the invention. Aside from the differences described below, the design is the same as that described on the basis of the first embodiment. Analogously to the second embodiment, the adjustment of the closure element 3 between its open position and its closed position takes place rectilinearly by virtue of the at least one valve rod 8 being displaced in an axial direction by the valve drive 10. In this case, the closure element 3 has a wedge-shaped form in cross section.

A first flange ring 21, which interacts with the first housing wall 19, delimits a first valve opening 4, and a second flange ring 39, which interacts with the second housing wall 36, delimits a second valve opening 38. The first flange ring 21 has a first valve seat 6 against which the closure element 3 is caused to bear, at its first side, when the vacuum valve is in the closed state. The second flange ring 39 has a second valve seat 52 against which the closure element 3 is caused to bear, at its second side situated opposite the first side, when the vacuum valve is in the closed state. In the exemplary embodiment shown, the first and second valve seats 6, 52 are formed by a sealing surface of the respective flange ring 21, 39, and the closure element 3 bears, by way of first and second elastomer seals 7, 53 arranged thereon, against the respective sealing surface when the vacuum valve is in the closed state. A reversed design is in turn also possible, in which the closure element 3 has the first and second sealing surfaces and the respective valve seat 6, 52 has an elastomer seal which surrounds the respective valve opening 4, 38.

The first and second sides of the closure element 3 and the first and second valve seats 6, 52 lie obliquely with respect to the axes 5, 41 of the valve openings 4, 38, wherein they are inclined in opposite directions in relation to a plane perpendicular to the axes 5, 41.

When the closure element 3 has been moved by means of the valve drive 10 into its closed position, it may be provided that the seals 7, 53 are compressed even without a pressure difference prevailing between the vacuum units 27, 40. It may however also be provided that the elastomer seals 7, 53 are caused to bear only lightly against the sealing surfaces and compression of the seals is effected only when a pressure difference prevails.

Such a design is known, for example from the prior art cited in the introduction.

Furthermore, in this embodiment, the vacuum valve and its connection to the vacuum units 27, 40 are identical to those described in conjunction with the first embodiment of the vacuum valve.

Figure 19:
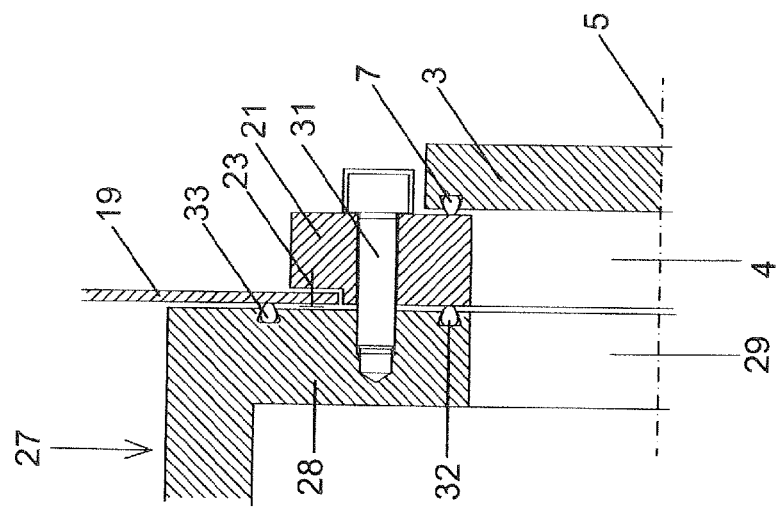
FIG. 19 is a schematic illustration, analogous to FIG. 9, of a fourth embodiment of a vacuum valve according to the invention.

FIG. 19 shows a detail of a fourth embodiment of a vacuum valve according to the invention. This may be a modification of the first embodiment described above.

The modification consists in that, for the production of a screw connection to a vacuum unit 27, the flange ring 21 has passage bores 54. The attachment flange 28 of the vacuum unit 27, to which the vacuum valve is connected by way of its valve opening 4, has threaded bores 55. Said threaded bores are in the form of blind bores and extend from that surface of the attachment flange 28 which faces toward the flange ring 21. Connecting screws 31 are screwed through the passage bores 54 into the threaded bores 55 of the attachment flange 28 from the direction of the interior space 2 of the valve housing 1. Heads of the connecting screws 31 are in this case supported on a surface, directed toward the interior space 2, of the flange ring 21.

At least one seal 32 is situated, in turn, between the flange ring 21 and the attachment flange 28. This seal may be arranged on the attachment flange 28 or on the flange ring 21 and seals said two parts with respect to one another in the state in which a connection is realized by way of the connecting screws 31.

The at least one seal 32 is situated radially to the inside of the connecting screws 31.

As in the exemplary embodiments described above, the flange ring 21 is connected to the housing wall 19 by way of retention screws 23, as is illustrated merely schematically in FIG. 19. In this exemplary embodiment, however, a sealing ring between the housing wall 19 and the flange ring 21 can be omitted.

In the state in which the vacuum valve is connected to the vacuum unit 27, the attachment flange 28 is sealed off with respect to the housing wall 19 by way of at least one sealing ring 33. This sealing ring is situated radially to the outside of the retention screws 23. The sealing ring 33 may be arranged on the attachment flange 28 or on the housing wall 19.

Thus, in this exemplary embodiment, the connecting screws 31 are situated in the vacuum region assigned to the interior space of the valve housing 1.

The vacuum valve may otherwise be of identical design to that illustrated in FIGS. 1 to 12.

The region of the second housing wall 36 with the second flange ring 39 and the connection to the second vacuum unit 40 may also be designed correspondingly to that in the illustration of FIG. 19. In the case of such a design of said components, it would also be possible for the vacuum valve to be designed, in the region of the first housing wall and of the first flange ring 21 and of the connection to the first vacuum unit 27, in the manner illustrated in FIGS. 1 to 14.

The other embodiments described may also be modified in an analogous manner to that illustrated in FIG. 19.

In the case of the embodiment illustrated in FIG. 19, it would also be possible for the sealing ring 33 to be dispensed with, and it would be possible, instead, for provision to be made of a sealing ring which is situated between the flange ring 21 and the connecting flange 28 and which is situated radially to the outside of the connecting screws 31, and of a sealing ring which is arranged between the flange ring 21 and the housing wall 19 and which is situated radially to the outside of the retention screws 23.

It would also be possible for the embodiment illustrated in FIG. 19 to be modified such that, analogously to the situation in FIGS. 11 to 14, an outwardly protruding attachment flange 28 in the form of an annular collar is provided.

Further modifications of the exemplary embodiments shown are conceivable and possible without departing from the scope of the invention. Accordingly, the invention may for example also be used in the case of vacuum valves which have a closure element which is spreadable during the closing movement. Also, the sealing between the flange ring, the housing wall with which the flange ring interacts, and the attachment flange to which the flange ring is connected, may be realized by way of modified arrangements of seals, for example if the connecting screws also extend through passage openings through the housing wall.

Since the retention screws 23 are without function in the state in which the flange ring 21, 39 is attached to the attachment flange 28, it would basically also be possible for such retention screws to be omitted. During assembly, it would then be necessary for the flange ring to initially be correspondingly positioned manually.

LIST OF REFERENCE NUMERALS

| | |
|---|---|
| 1 | Valve housing |
| 2 | Interior space |
| 3 | Closure element |
| 4 | Valve opening |
| 5 | Axis |
| 6 | Valve seat |
| 7 | Seal |
| 8 | Valve rod |
| 9 | Cross member |
| 10 | Valve drive |
| 11 | First actuator |
| 12 | Second actuator |
| 13 | Pivot axis |
| 14 | Piston |
| 15 | Drive housing |
| 16 | Restoring spring |
| 17 | Piston |
| 18 | Corrugated bellows |
| 19 | Housing wall |
| 20 | Window recess |
| 21 | Flange ring |
| 22 | Threaded bore |
| 23 | Retention screw |
| 24 | Threaded bore |
| 25 | Hole |
| 26 | Sealing ring |
| 27 | Vacuum unit |
| 28 | Attachment flange |
| 29 | Opening |
| 30 | Passage bore |
| 31 | Connecting screw |
| 32 | Seal |
| 33 | Sealing ring |
| 34 | Gap |
| 35 | Gap |
| 36 | Housing wall |
| 37 | Window recess |
| 38 | Valve opening |
| 39 | Flange ring |
| 40 | Vacuum unit |
| 41 | Axis |
| 42 | Side wall |
| 43 | Side wall |
| 44 | Flange part |
| 45 | Flange part |
| 46 | Base part |
| 47 | Cover part |
| 48 | Sealing ring |
| 49 | Sealing ring |
| 50 | Opening |
| 51 | Opening |
| 52 | Valve seat |
| 53 | Seal |
| 54 | Passage bore |
| 55 | Threaded bore |

The invention claimed is:

1. A vacuum valve comprising a closure element, a valve housing with a valve opening and an interior space in which the closure element is arranged, said closure element, in a closed state of the vacuum valve, bears against a valve seat surrounding the valve opening, the valve housing including a housing wall which delimits the interior space and which is comprised of sheet metal and which, to form the valve opening, is provided with a window recess, and wherein the valve opening is surrounded by a flange ring which is connectable by way of screw connections to an attachment flange of a vacuum unit which has an interior space, to which vacuum unit the vacuum valve is attachable, the flange ring has the valve seat against which the closure element is caused to bear when the vacuum valve is in the closed state, wherein the housing wall is adapted to be clamped between the flange ring of the vacuum valve and the attachment flange of the vacuum unit.

2. The vacuum valve as claimed in claim 1, wherein, for connection to the attachment flange of the vacuum unit, the flange ring includes threaded bores for connecting screws to be screwed into or passage bores for connecting screws to be passed through.

3. The vacuum valve as claimed in claim 1, wherein the flange ring, at a side thereof situated opposite the valve seat, is supported on the housing wall in a support region of the housing wall, said support region adjoins the window recess of the housing wall and surrounds the window recess.

4. The vacuum valve as claimed in claim 1, wherein the flange ring is connected to the housing wall by retention screws.

5. The vacuum valve as claimed in claim 4, wherein the retention screws extend through holes in the housing wall and are screwed into threaded bores of the flange ring.

6. The vacuum valve as claimed in claim 1, wherein the sheet metal of the housing wall has a thickness of less than 5 mm.

7. The vacuum valve as claimed in claim 1, wherein, as viewed in a direction of the axis of the valve opening, a thickness of the flange ring amounts to more than three times the thickness of the housing wall.

8. The vacuum valve as claimed in claim 1, wherein the flange ring, on a side thereof facing toward the housing wall, has a depression in which the housing wall lies by way of a region adjoining the window recess.

9. The vacuum valve as claimed in claim 1, wherein the valve housing further comprises a second housing wall comprised of sheet metal, said second housing wall, to form a further valve opening of the valve housing, is provided with a window recess, and a second flange ring is provided which surrounds the further valve opening and which is connectable by screw connections to an attachment flange of a further vacuum unit, to which the vacuum valve can be attached.

10. The vacuum valve as claimed in claim 9, wherein, for connection to the attachment flange of the further vacuum unit, the second flange ring has threaded bores for connecting screws to be screwed into or passage bores for connecting screws to be passed through.

11. The vacuum valve as claimed in claim 9, wherein the first and the second housing wall are arranged on opposite sides of the valve housing.

12. The vacuum valve as claimed in claim 9, wherein the first and second housing walls are connected by first and second side walls which are comprised of sheet metal and are connected to one another by way of a cover part and a base part of the valve housing, and the cover part and the base part have, at least in regions, a material thickness of greater than 5 mm.

13. A vacuum installation comprising a vacuum unit which has an interior space and comprising a vacuum valve which is connected to the vacuum unit, said vacuum valve including a closure element and a valve housing with a valve opening, the valve housing surrounds an interior space in which the closure element is arranged, said closure element, in a closed state of the vacuum valve, bears against a valve seat surrounding the valve opening, wherein the valve housing further comprising a housing wall which delimits the interior space and which is comprised of sheet metal and which, to form the valve opening, is provided with a window recess, and wherein the valve opening is surrounded by a flange ring which is connected by screw connections to an attachment flange of the vacuum unit, and the flange ring includes the valve seat against which the closure element is caused to bear when the vacuum valve is in the closed state, wherein the housing wall is clamped between the flange ring of the vacuum valve and the attachment flange of the vacuum unit.

14. The vacuum installation as claimed in claim 13, wherein, for connection of the vacuum valve to the vacuum unit, the flange ring has threaded bores, into which connecting screws extending through passage bores through the attachment flange are screwed, or the attachment flange has threaded bores, into which connecting screws extending through passage bores through the flange ring are screwed.

\* \* \* \* \*